US011774594B2

(12) United States Patent
Peterson et al.

(10) Patent No.: US 11,774,594 B2
(45) Date of Patent: Oct. 3, 2023

(54) AIR DATA SYSTEM WITH OPTICAL MODULATOR ON RECEIVE CHANNELS FOR STROBOSCOPIC DETECTION

(71) Applicant: Honeywell International Inc., Morris Plains, NJ (US)

(72) Inventors: Timothy A. Peterson, Minneapolis, MN (US); Xiao Zhu Fan, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 511 days.

(21) Appl. No.: 16/909,784

(22) Filed: Jun. 23, 2020

(65) Prior Publication Data
US 2021/0396884 A1 Dec. 23, 2021

(51) Int. Cl.
*G01S 17/89* (2020.01)
*G01S 17/931* (2020.01)
*G01S 7/4865* (2020.01)
*G01S 17/10* (2020.01)
*G01S 17/933* (2020.01)

(52) U.S. Cl.
CPC ............ *G01S 17/89* (2013.01); *G01S 7/4865* (2013.01); *G01S 17/10* (2013.01); *G01S 17/931* (2020.01); *G01S 17/933* (2013.01)

(58) Field of Classification Search
CPC ........ G01S 17/89; G01S 17/931; G01S 17/10; G01S 17/933; G01S 7/4865
(Continued)

(56) References Cited

U.S. PATENT DOCUMENTS 7,495,774 B2  2/2009  Hays et al.
7,522,291 B2  4/2009  Hays et al.
(Continued)

FOREIGN PATENT DOCUMENTS

CN   110261644 A   9/2019
EP   3361264 A1   8/2018
(Continued)

OTHER PUBLICATIONS

Fraczek et al., "Laser-based air data system for aircraft control using Raman and elastic backscatter for the measurement of temperature, density, pressure, moisture, and particle backscatter coefficient", Applied Optics, Jan. 10, 2012, pp. 1 through 148, vol. 51, No. 2, Optical Society of America.
(Continued)

*Primary Examiner* — Nguyen T Truong
(74) *Attorney, Agent, or Firm* — Fogg & Powers LLC (57) ABSTRACT

An air data system comprises a light source that emits a pulsed beam, and an optical transceiver coupled to the light source and configured to receive the pulsed beam. The transceiver is operative to transmit the pulsed beam into an interrogation air region; and receive and collect scattered pulses from the interrogation air region. An optical modulation device is coupled to the transceiver, and is configured to receive the collected scattered pulses from the transceiver and output modulated pulses. An optical detector is coupled to the modulation device and receives the modulated pulses from the modulation device. The modulation device has a nanosecond-based rise/fall time that is synchronized and delayed with respect to the pulsed beam. The modulation device provides for stroboscopic detection of a volume of the interrogation air region based on the modulated pulses received by the detector and having an exposure time of multiple pulse periods.

20 Claims, 5 Drawing Sheets

(58) Field of Classification Search
USPC .......................................................... 356/5.01
See application file for complete search history.

(56) References Cited

U.S. PATENT DOCUMENTS

| | | | |
|---|---|---|---|
| 8,068,216 | B2 | 11/2011 | Caldwell et al. |
| 8,390,791 | B2 | 3/2013 | Vert et al. |
| 8,692,983 | B1 | 4/2014 | Chapman et al. |
| 8,810,796 | B2 | 8/2014 | Hays et al. |
| 8,908,160 | B2 | 12/2014 | Dakin et al. |
| 9,383,447 | B2 | 7/2016 | Schmitt et al. |
| 10,012,732 | B2 | 7/2018 | Eichenholz et al. |
| 10,591,600 | B2 | 3/2020 | Villeneuve et al. |
| 2008/0128595 | A1* | 6/2008 | Kiesel .................. G01J 9/0246 250/214 R |
| 2013/0162974 | A1 | 6/2013 | Dakin et al. |
| 2018/0088238 | A1 | 3/2018 | Garde et al. |
| 2018/0269646 | A1* | 9/2018 | Welford .................. G01S 7/484 |
| 2019/0086544 | A1 | 3/2019 | Lodden et al. |
| 2019/0302141 | A1 | 10/2019 | Caldwell et al. |

FOREIGN PATENT DOCUMENTS

| | | |
|---|---|---|
| WO | 2006083349 A2 | 8/2006 |
| WO | 2007036933 A2 | 4/2007 |

OTHER PUBLICATIONS

Watkins et al., "Molecular optical air data system (MOADS) prototype II", Laser Radar Technology and Applications IX, 2004, pp. 10 through 20, Proceedings of SPIE vol. 5412, downloaded from http://proceedings.spiedigitallibrary.org/ on May 25, 2015.

Isomet Corp; "M1212-aQ110-2-(A/R)—Acousto-Optic Modulator" pp. 1-3; Published Jan. 2017.

European Patent Office, "Extended European Search Report from EP Application No. 21178102.6-1202", from Foreign Counterpart to U.S. Appl. No. 16/909,784, dated Nov. 17, 2021, pp. 1 through 10, Published: EP.

European Patent Office, "Communication pursuant to Article 94(3) EPC", from EP Application No. 21178102.6, dated Aug. 30, 2022 from Foreign Counterpart to U.S. Appl. No. 16/909,784, pp. 1 through 6, Published: EP.

* cited by examiner

AIR DATA SYSTEM WITH OPTICAL MODULATOR ON RECEIVE CHANNELS FOR STROBOSCOPIC DETECTION

BACKGROUND

An optical air data system operates by transmitting a laser beam into an air region, collecting backscattered light from the laser beam in sky receive channels, and integrating over the exposure time of a detector. A typical purpose of this optical air data system is to remotely interrogate air data parameters away from the skin of an aircraft in the so-called free-stream region, which is typically several meters away from the aircraft skin.

A short range optical air data system may use a pulsed laser. However, current methods of receive light detection do not utilize the short pulse nature of laser operation to range-resolve the backscattered light, but rather rely on a bi-statically aligned transmit/receive overlap function that is geometrically determined by beam overlap. The drawback of such a geometrically determined beam overlap is that different aircraft or flight conditions require costly and time consuming geometrical optics hardware designs.

SUMMARY

An air data system comprises at least one light source configured to emit a pulsed light beam, and an optical transceiver operatively coupled to the at least one light source and configured to receive the emitted pulsed light beam. The optical transceiver is operative to transmit the pulsed light beam into an interrogation air region; and receive and collect scattered light pulses of the transmitted pulsed light beam from the interrogation air region. An optical modulation device is operatively coupled to the optical transceiver. The optical modulation device is configured to receive the collected scattered light pulses from the optical transceiver and output modulated light pulses. An optical detector is operatively coupled to the optical modulation device and configured to receive the modulated light pulses from the optical modulation device. The optical modulation device has a nanosecond-based rise/fall time that is synchronized and delayed with respect to the pulsed light beam. The optical modulation device is operative to provide for stroboscopic detection of a volume of the interrogation air region based on the modulated light pulses received by the optical detector and having an exposure time of multiple pulse periods.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

An air data system that includes an optical modulator on one or more receive channels for stroboscopic detection is described herein.

The present air data system provides a solution to the drawbacks of prior air data systems by allowing stroboscopic detection of return light pulses on a slow (e.g., millisecond to second scale) optical detector such as an integrating detector. As used herein, "stroboscopic detection" refers to the utilization of a pulsed light source with a variable delay pulse synchronized detector, to allow selection of fast exposure phenomena on a relatively slow integrating detector. The stroboscopic nature of the detection allows variable delay selection, which enables dynamic control of the interrogation volume due to internal or external control input.

The air data system described herein is unique in that it can augment fiber-coupled and millisecond integrated detection of incoherent ultraviolet (UV) light detection and ranging (LiDAR) backscatter, with range resolution capability more typically found in low repetition rate time of flight, atmospheric, or hard target LiDAR systems.

The air data system is particularly useful with kHz, narrow (few ns or shorter) pulsed lasers, used with milliseconds to seconds integration times, to enable meters-scale control of the interrogation volume. The dynamic and electrical setting of the rejection of backscatter collected within a perturbed air region around a vehicle, such an aircraft, enables lower cost and increased modularity of optical head modules used in the air data system.

The present air data system employs an optical modulator device, such as an acousto-optic modulator (AOM) or an electro-optic modulator (EOM), in the receive optical channel to provide stroboscopic detection capability. The AOM device or EOM device is used as a fast optical shutter or modulator in the air data system.

In exemplary implementations, a modulator drive is synchronized with laser pulses by use of a fast photodiode pickoff. Moreover, a delay is set between the modulator drive and the laser pulses such that the backscattered light that is scattered in close proximity to a vehicle, such as an aircraft, can be rejected by choice of delay time. The delay time is chosen so that only laser light that travels a sufficient round-trip length will be incident on the detector. For example, the delay time can be chosen for particular aircraft, aircraft mounting location, or dynamically adjusted based on flight conditions. In addition, the use of a time-gated backscatter detection allows the use of a simpler coaxial (monostatic) LiDAR telescope geometry. For example, a monostatic LiDAR configuration can be implemented that has a variable short range return rejection.

Ranging of the interrogation region is done by time gating of the return pulse signal. The variable delay in the stroboscopic detection electrically controls the interrogation volume of the interrogation region, which can be dynamically varied depending on conditions inferred from either internal or external sensor input. This provides for optimizing the performance of the air data system.

In one embodiment, the present air data system can be implemented as an incoherent optical air data system. An "incoherent" system utilizes a detector allowing direct measurement of sky backscatter (and reference) light frequencies to infer Doppler shift(s). This is in contrast to a "coherent" system, which typically utilizes phase-sensitive optical heterodyne detection to infer Doppler shift(s).

Further details of various embodiments are described hereafter with reference to the drawings.

Figure 1:
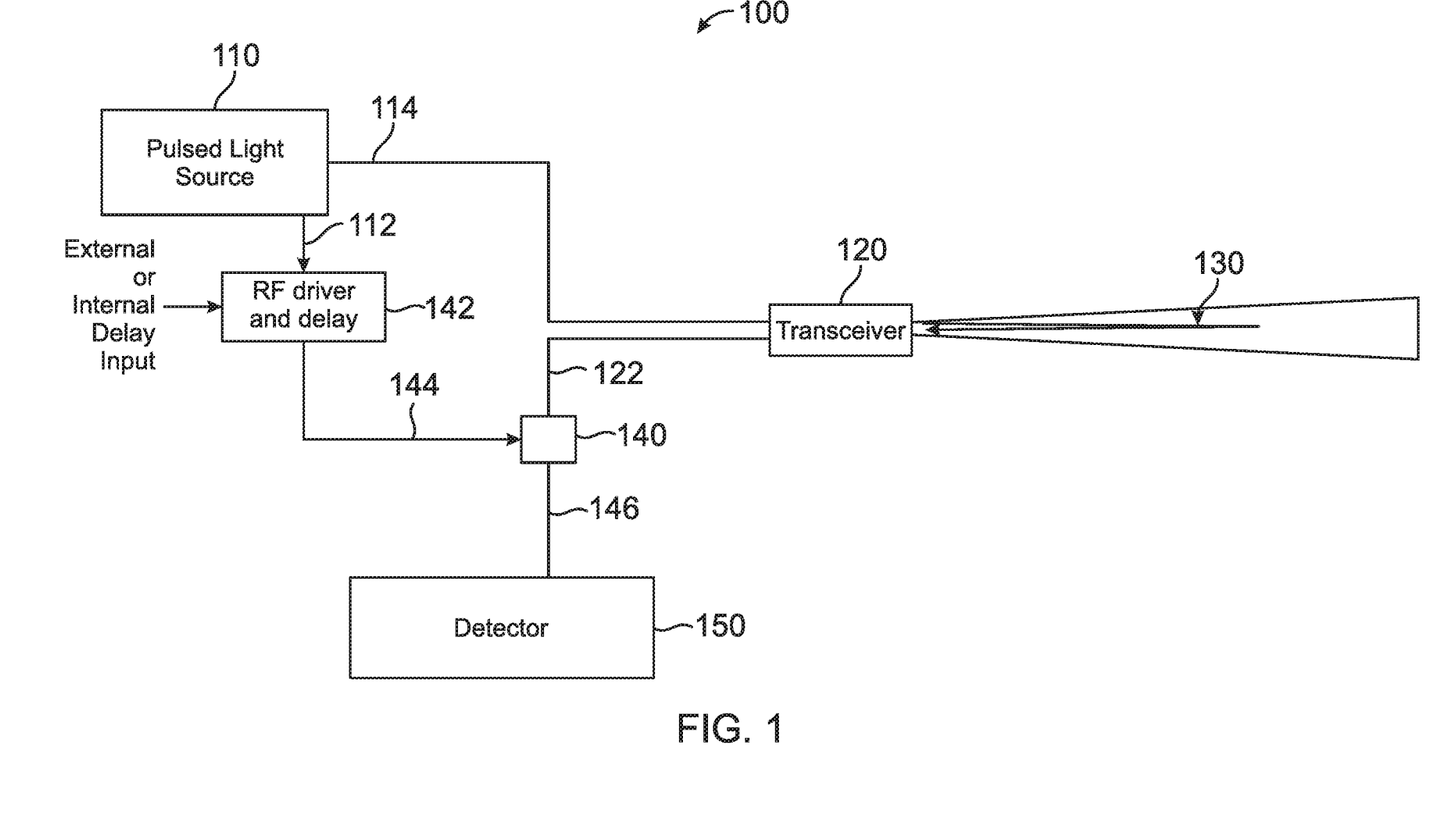
FIG. 1 is a block diagram of an air data system with stroboscopic detection, according to one embodiment.

FIG. 1 is a block diagram of an air data system 100, according to one embodiment. The air data system 100 includes at least one light source 110 configured to emit a pulsed light beam, such as a pulsed laser device. An optical transceiver 120 is operatively coupled to light source 110 and is configured to receive the emitted pulsed light beam from light source 110. The optical transceiver 120 is operative to transmit (Tx) the pulsed light beam into an interrogation air region 130. The optical transceiver 120 is also operative to receive (Rx) and collect scattered light pulses of the transmitted pulsed light beam from interrogation air region 130.

An optical modulation device 140 is operatively coupled to optical transceiver 120. The optical modulation device 140 is configured to receive the collected scattered light pulses from optical transceiver 120 through a receive channel, and output modulated light pulses. An optical detector 150 is operatively coupled to optical modulation device 140 and is configured to receive the modulated light pulses from optical modulation device 140.

In one implementation, optical modulation device 140 can be an electro-optic modulator (EOM). An EOM is an optical device in which a signal-controlled element exhibiting an electro-optic effect is used to modulate the light pulses at high speeds, such as Nanosecond or sub-nanosecond (GHz) timescales (frequencies). In another implementation, optical modulation device 140 can be an acousto-optic modulator (AOM). An AOM is an optical device that uses the acousto-optic effect to diffract and shift the frequency of the light pulses at high speed by using sound waves, usually at a radio frequency (RF).

In one embodiment, optical modulation device 140 is configured to have a nanosecond-based rise/fall time, and is coupled to an RF driver and delay device 142, which is operative to receive a pick-off signal 112 from light source 110, such as through a fast photodiode. The RF driver and delay device 142 is also operative to receive an external or internal time delay input, such as from a pilot or an onboard control system.

In one embodiment, a first optical fiber 114 is coupled between an output fiber coupling port of light source 110 and a transmit channel fiber coupling port of optical transceiver 120. A second optical fiber 122 is coupled between a receive channel fiber coupling port of optical transceiver 120 and an input fiber coupling port of optical modulation device 140. A third optical fiber 146 is coupled between an output fiber coupling port of optical modulation device 140 and an input fiber coupling port of optical detector 150.

During operation of air data system 100, RF driver and delay device 142 sends an on/off trigger signal 144, such as an electrical (RF) drive signal, to optical modulation device 140 to turn device 140 on and off, which gives rise to time modulation of the received light pulses that are fed as an input to optical detector 150. The trigger signal 144 allows optical modulation device 140 to synchronize and delay the received light pulses. This provides for stroboscopic detection of the modulated light pulses on optical detector 150 with an exposure time of multiple pulse periods. The external or internal delay input to RF driver and delay device 142 optionally provides for a varying time delay for trigger signal 144 sent to optical modulation device 140, to dynamically vary the volume of the interrogation air region.

In one embodiment of an EOM device implementation, a Pockels cell cross-polarizer configuration can be used in combination with a triggered drive voltage to allow intensity modulation. For such devices, modulation bandwidths of several GHz (greater than 1 nanosecond rise/fall time) are achievable.

In one embodiment of an AOM device implementation, when the RF drive is on with appropriate power level, the incoming backscatter light is diffracted into the first order, where the output fiber coupling port of the AOM device is positioned. When the RF drive to the AOM device is off, the received backscatter light is not diffracted and is directed into a suitable beam dump. Greater than about 2000:1 on/off ratios can be achieved using the AOM device. The on/off time of the AOM device can be on the order of nanoseconds (depending on beam size and crystal type for the AOM implementation). A less than 3 dB insertion loss of the modulator may be achieved with use of the AOM device.

Figure 2:
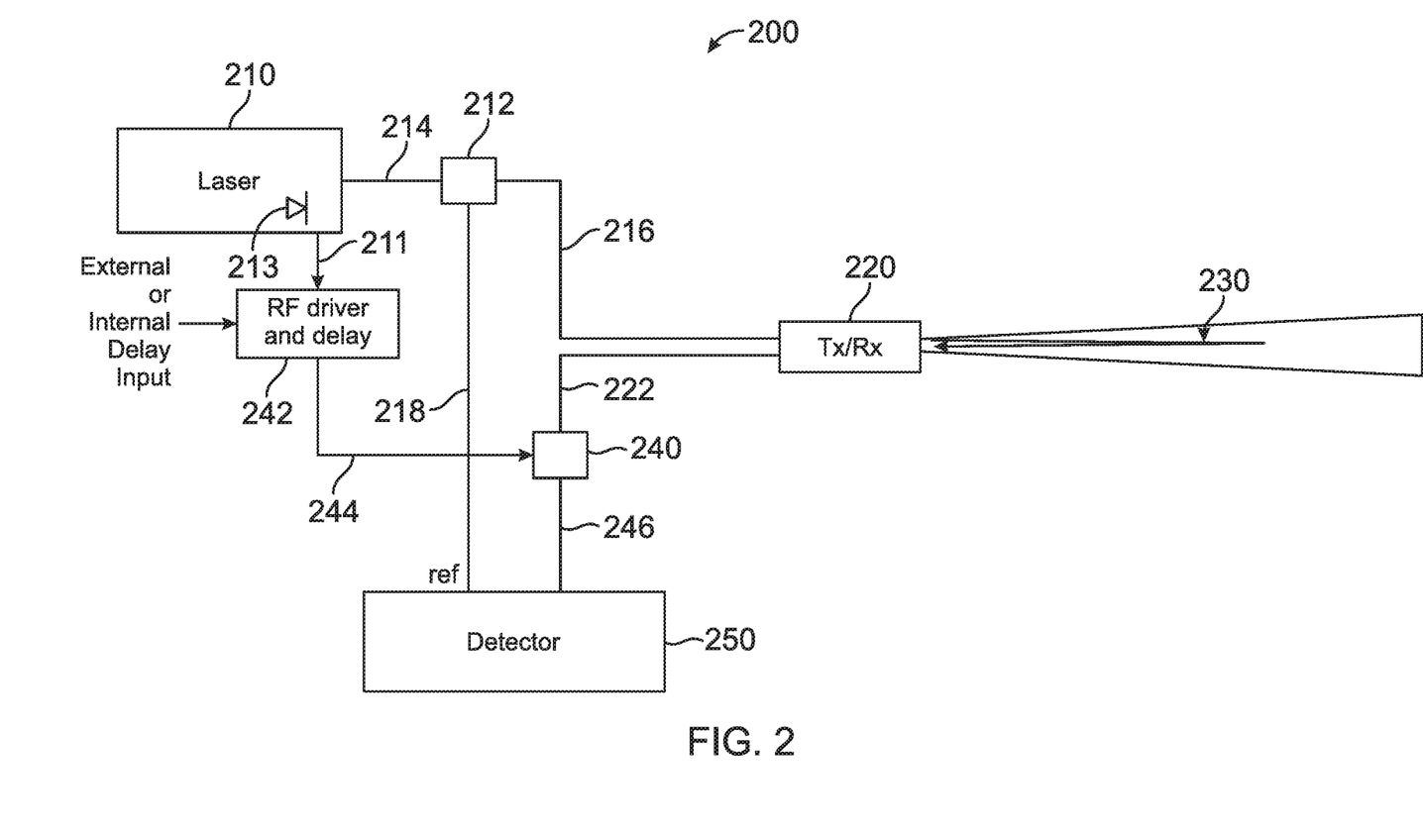
FIG. 2 is a block diagram of an air data system with stroboscopic detection, according to another embodiment.

FIG. 2 is a block diagram of an air data system 200, according to another embodiment. The air data system 200 includes similar features as discussed above for air data system 100, including a laser device 210 configured to emit a pulsed light beam, and an optical transceiver 220 operatively coupled to laser device 210. The optical transceiver 220 is operative to receive the emitted pulsed light beam from laser device 210, and to transmit the pulsed light beam into an interrogation air region 230. The optical transceiver 220 is also operative to receive and collect scattered light pulses of the transmitted pulsed light beam from interrogation air region 230.

An optical modulation device 240 is operatively coupled to optical transceiver 120. The optical modulation device 240 is configured to receive the collected scattered light pulses from optical transceiver 220 through a receive channel, and output modulated light pulses. An optical detector 250 is operatively coupled to optical modulation device 240 and is configured to receive the modulated light pulses from optical modulation device 240.

In one implementation, optical modulation device 240 is an EOM device, such as described previously. In another implementation, optical modulation device 240 is an AOM device, such as described previously The optical modulation device 240 is configured to have a nanosecond-based rise/fall time, and is coupled to an RF driver and delay device 242, which is operative to receive a pick-off signal 211 from laser device 210, such as, but not limited to, through a pickoff photodiode 213. The photodiode 213 is included as part of the output of laser device 210 to measure the pulse timing of laser device 210. The RF driver and delay device 242 is also operative to receive an external or internal delay input. The RF drive signal from RF driver and delay device 242 allows optical modulation device 240 to synchronize and delay the received light pulses.

In one implementation, a beam splitter 212 is operatively coupled between laser device 210 and optical transceiver 220, with beam splitter 212 configured to receive the emitted pulsed light beam from laser device 210. The beam splitter 212 is operative to direct a first portion of the pulsed light beam to optical transceiver 220 and a second portion of the pulsed light beam to optical detector 250. The second portion of the pulsed light beam provides a reference for use by the optical detector in the stroboscopic detection based on the modulated light pulses from optical modulation device 240.

In one embodiment, a first optical fiber 214 is coupled between an output fiber coupling port of laser device 210 and an input fiber coupling port of beam splitter 212. A second optical fiber 216 is coupled between a first output fiber coupling port of beam splitter 212 and a transmit channel fiber coupling port of optical transceiver 220. A third optical fiber 218 is coupled to a second output fiber coupling port of beam splitter 212 and a first input fiber coupling port of optical detector 250. Additionally, a fourth optical fiber 222 is coupled between a receive channel fiber coupling port of optical transceiver 220 and an input fiber coupling port of optical modulation device 240. A fifth optical fiber 246 is coupled between an output fiber coupling port of optical modulation device 240 and a second input fiber coupling port of optical detector 250.

During operation of air data system 200, RF driver and delay device 242 sends a trigger signal 244, such as an RF drive signal, to optical modulation device 240 to turn device 240 on and off, which gives rise to time modulation of the received light pulses that are fed to optical detector 250. The trigger signal 244 allows optical modulation device 240 to synchronize and delay the received light pulses. The external or internal delay input to RF driver and delay device 242 provides a varying time delay for trigger signal 244 sent to optical modulation device 240, to dynamically vary the volume of the interrogation air region.

Figure 3:
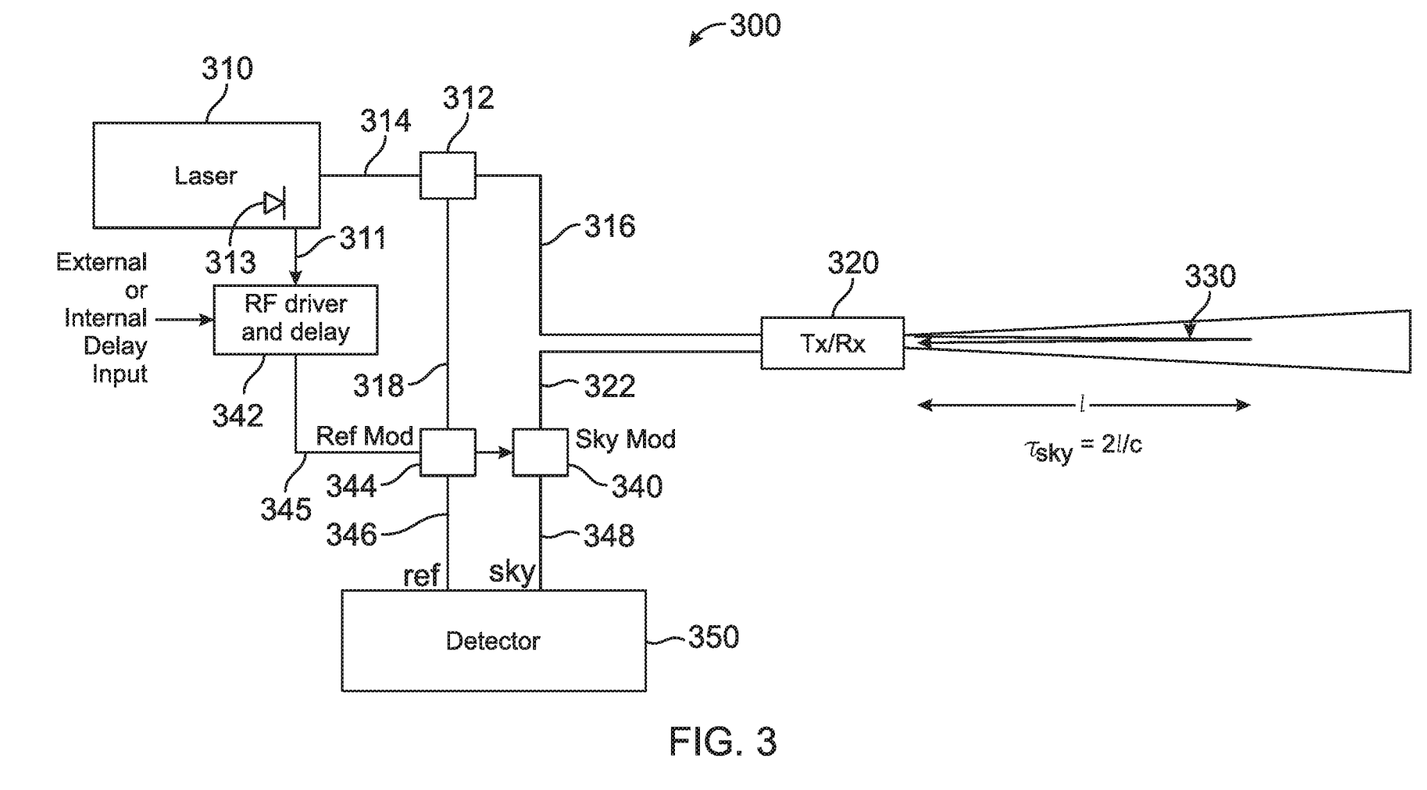
FIG. 3 is a block diagram of an air data system with stroboscopic detection, according to an alternative embodiment.

FIG. 3 is a block diagram of an air data system 300, according to an alternative embodiment. The air data system 300 includes a laser device 310 configured to emit a pulsed light beam, and an optical transceiver 320 operatively coupled to laser device 310. The optical transceiver 320 is operative to receive the emitted pulsed light beam from laser device 310, and to transmit the pulsed light beam into an interrogation air region 330. The optical transceiver 320 is also operative to receive and collect scattered light pulses of the transmitted pulsed light beam from interrogation air region 330.

A sky modulation device 340 is operatively coupled to optical transceiver 320, and is configured to receive the collected scattered light pulses from optical transceiver 320 through a receive channel, and output modulated light pulses. In addition, a reference modulation device 344 is operative to receive a portion of the pulsed light beam from laser device 310 through a reference channel.

An optical detector 350 is operatively coupled to sky modulation device 340 and reference modulation device 344. The optical detector 350 is configured to receive sky light pulses from sky modulation device 340 and reference light pulses from reference modulation device 344. In some embodiments, optical detector 350 can have subdetectors for respectively detecting the sky pulse and the reference pulse.

In one implementation, sky modulation device 340 and reference modulation device 344 are EOM devices, such as those described previously. In another implementation, sky modulation device 340 and reference modulation device 344 are AOM devices, such as those described previously.

The sky modulation device 340 is configured to have a nanosecond-based rise/fall time, and is coupled to an RF driver and delay device 342. The RF driver and delay device 342 is operative to receive a pick-off signal 311 from laser device 310, such as through a fast pickoff photodiode 313. The pickoff photodiode 313 is included as part of the output of laser device 310 to measure the pulse timing of laser device 310. The RF driver and delay device 342 is also operative to receive an external or internal delay input. In addition, reference modulation device 344 is also coupled to RF driver and delay device 344.

In one implementation, a beam splitter 312 is operatively coupled between laser device 310 and optical transceiver 320, with beam splitter 312 configured to receive the emitted pulsed light beam from laser device 310. The beam splitter 312 is operative to direct a first portion of the pulsed light beam to optical transceiver 320 and a second portion of the pulsed light beam to reference modulation device 344, which outputs a modulated reference pulse to optical detector 350.

In one embodiment, a first optical fiber 314 is coupled between an output fiber coupling port of laser device 310 and an input fiber coupling port of beam splitter 312. A second optical fiber 316 is coupled between a first output fiber coupling port of beam splitter 312 and a transmit channel fiber coupling port of optical transceiver 320. A third optical fiber 318 is coupled to a second output fiber coupling port of beam splitter 312 and an input fiber coupling port of reference modulation device 344. Additionally, a fourth optical fiber 322 is coupled between a receive channel fiber coupling port of optical transceiver 320 and an input fiber coupling port of sky modulation device 340. A fifth optical fiber 346 is coupled between an output fiber coupling port of reference modulation device 344 and a first input fiber coupling port of optical detector 350. A sixth optical fiber 348 is coupled between an output fiber coupling port of sky modulation device 340 and a second input fiber coupling port of optical detector 350.

During operation of air data system 300, RF driver and delay device 342 sends a trigger signal 345, such as an RF drive signal, to reference modulation device 344 and sky modulation device 340, which gives rise to time modulation of the received light pulses that are fed to optical detector 350. The trigger signal 345 allows sky modulation device 340 to synchronize and delay the received light pulses. The external or internal delay input to RF driver and delay device 342 provides a varying time delay for trigger signal 345, to dynamically vary the volume of the interrogation air region. The reference modulation device 344 provides the ability to impart an identical frequency shift as in sky modulation device 340, for ease of detector frequency discrimination.

As constant frequency shift associated with the modulation device mechanism (e.g., 110 MHz) can be subtracted in software, or all sky channels and the reference channel can experience the same modulation drive frequency. The time delay chosen can be set from external sources (e.g., pilot or external sensor), or can be automatically set internally from system calculated air data.

Figure 4A:
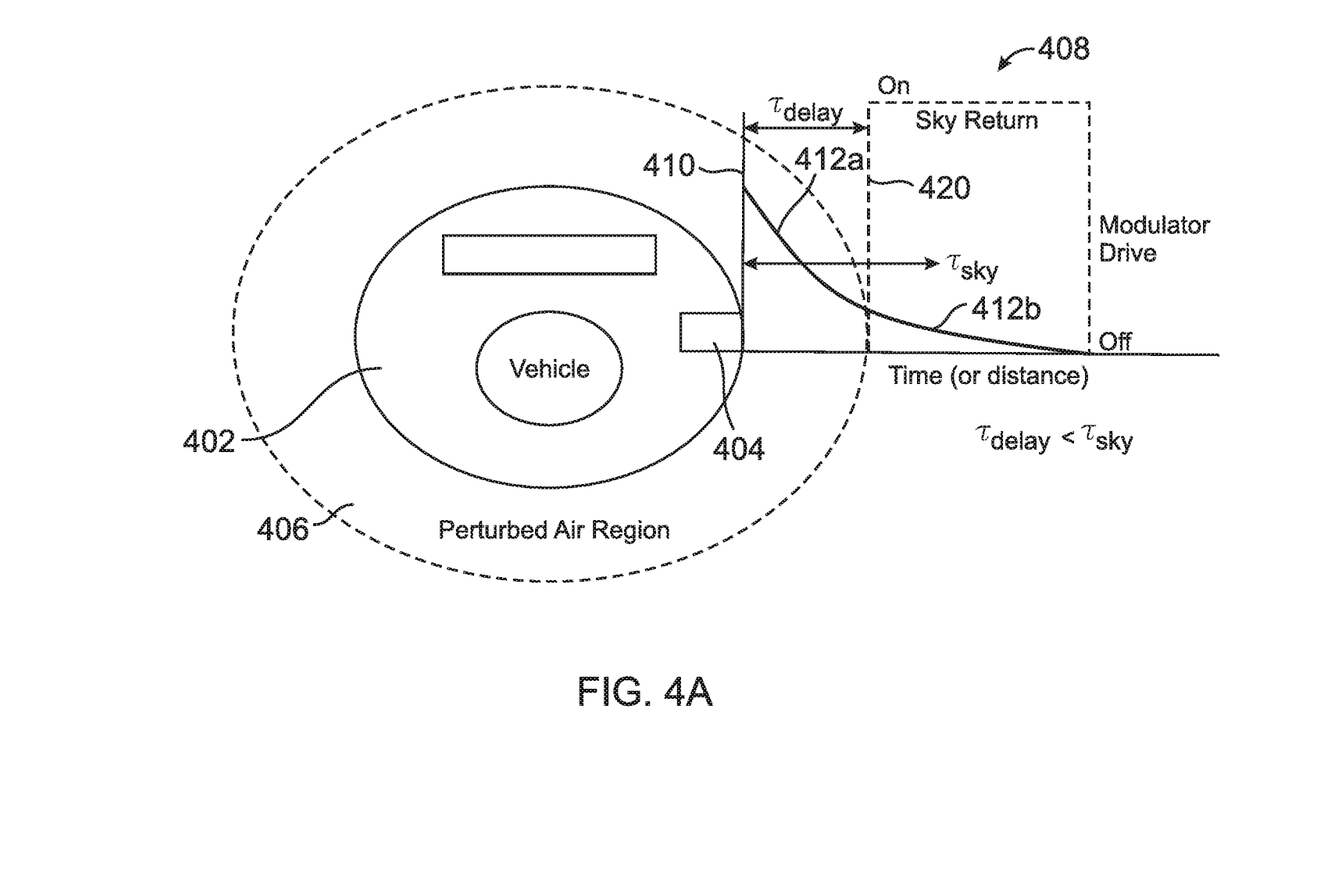
FIGS. 4A and 4B are graphical representations of an exemplary mechanism of operation for an air data system with stroboscopic detection.
Figure 4B:
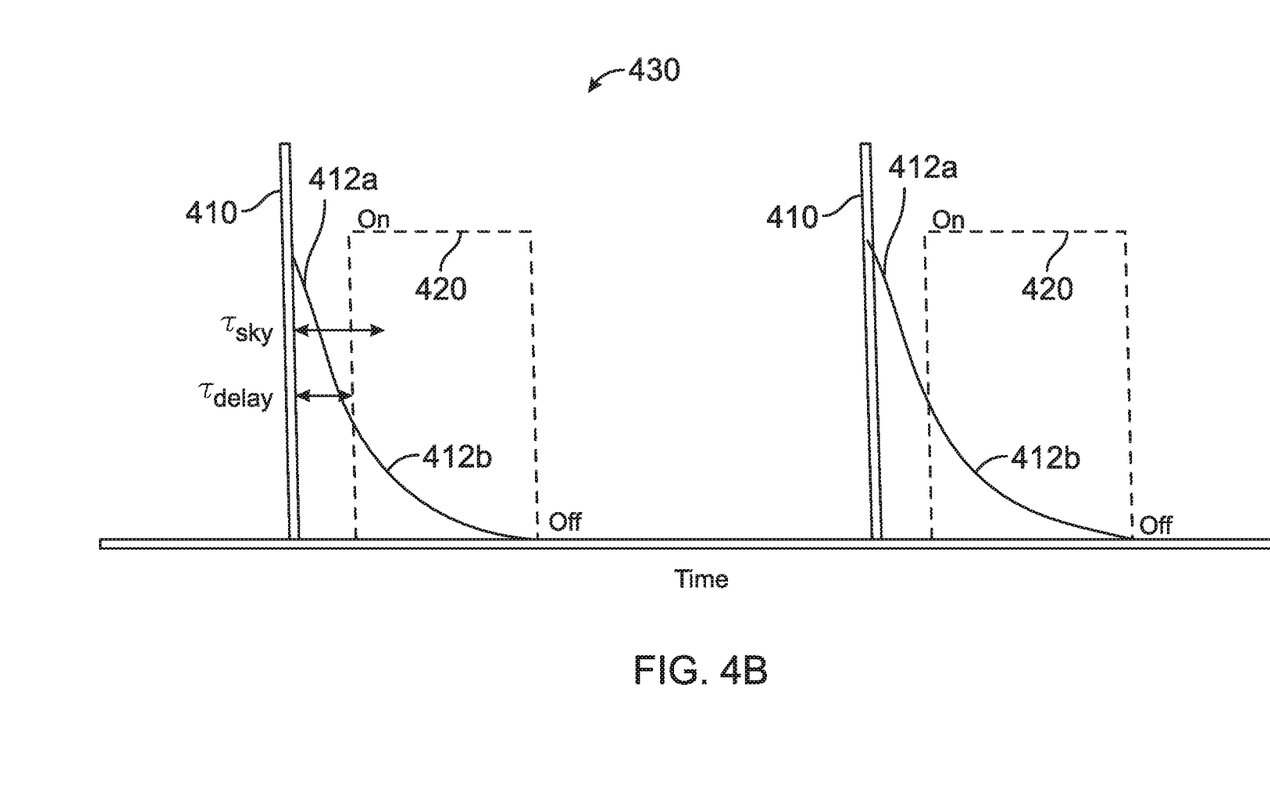

FIGS. 4A and 4B are graphical representations of an exemplary mechanism of operation for an air data system with stroboscopic detection, such as the above described air data systems of FIGS. 1-3.

As shown in the example of FIG. 4A, a vehicle 402 such as an aircraft is implemented with an air data system 404, such as those described previously, and a perturbed air region 406 surrounds vehicle 402. A plot 408 illustrates an exemplary operation of air data system 404. A laser pulse 410 is emitted by air data system 404 with respect to a time scale repetition rate, which is typically in nanoseconds.

Because of the finite speed of light (c), a return pulse (sky return) from the interrogation air region, which is received in the receive channel and directed to the optical detector, has a continuous scatter curve that decays in time. A first portion 412a of the scatter curve corresponds to scattered light within perturbed air region 406, and a second portion 412b of the scatter curve corresponds to scattered light outside of perturbed air region 406 and within the interrogation region of interest.

When the optical modulator in the receive path is turned on by the modulator drive signal, the optical modulator acts as an optical switch to let the return pulse through to the detector. The modulator is turned on at a selected delay time ($\tau_{delay}$) after laser pulse 410, so that the detector only receives scattered light that has been transmitted at a certain range length (l) in the interrogation air region (see FIG. 3). The received scattered light is represented by second portion 412b of the scatter curve in plot 408.

The sky time ($\tau_{sky}$) is greater than $\tau_{delay}$, and corresponds to the duration during which the collection of scattered light occurs from the volume of the interrogation air region of interest. The sky time is defined by the following expression:

$$\tau_{sky} = 2l/c$$

This expression provides for mapping between the delay time and the range in which the air data system is interrogating. The modulator drive provides a window of ranges defined by curve 420, in which light is collected from the interrogation air region beyond the perturbed air region. The leading edge of curve 420 represents when the modulator is turned ON after the selected $\tau_{delay}$. The leading edge of curve 420 also indicates the minimum range length where light is collected from the interrogation air region. The trailing edge of curve 420 represents when the modulator is turned OFF after a certain time. The trailing edge of curve 420 also indicates the maximum range length where light is collected from the interrogation air region. The RF driver sends an electrical signal to the modulator to turn it on and off, which gives rise to the time modulation of the received light that is fed to the detector. The detector then analyzes the sky return scattered light that is only within the window defined by curve 420 and represented by second portion 412b of the scatter curve in plot 408.

FIG. 4B depicts an exemplary pulse train plot 430, such as for air data system 404 in the example of FIG. 4A. The pulse train plot includes a series of laser pulses 410 with respect to a time scale repetition rate of the laser pulses. The first portion 412a of the scatter curves corresponds to scattered light within the perturbed air region, and second portion 412b of the scatter curves corresponds to scattered light outside of the perturbed air region and within the interrogation air region. Again, $\tau_{sky}$ is greater than $\tau_{delay}$.

When the modulator is turned on at $\tau_{delay}$ after each laser pulse 410, the detector only receives scattered light that has been transmitted at a certain range length in the interrogation air region. The received scattered light is represented by second portions 412b of the scatter curves in plot 430. The modulator drive provides a window of ranges defined by curves 420, in which light is collected from the interrogation air region. The leading edge of curves 420 represents when the modulator is turned ON after Tdela$_y$, and the trailing edge of curves 420 represents when the modulator is turned OFF. The detector analyzes the sky return scattered light that is only within the windows defined by curves 420. Again, the sky return scattered light is represented by second portions 412b of the scatter curves in plot 430.

EXAMPLE EMBODIMENTS

Example 1 includes an air data system, comprising: at least one light source configured to emit a pulsed light beam; an optical transceiver operatively coupled to the at least one light source and configured to receive the emitted pulsed light beam, the optical transceiver operative to: transmit the pulsed light beam into an interrogation air region; and receive and collect scattered light pulses of the transmitted pulsed light beam from the interrogation air region; an optical modulation device operatively coupled to the optical transceiver, the optical modulation device configured to receive the collected scattered light pulses from the optical transceiver and output modulated light pulses; and an optical detector operatively coupled to the optical modulation device and configured to receive the modulated light pulses from the optical modulation device; wherein the optical modulation device has a nanosecond-based rise/fall time that is synchronized and delayed with respect to the pulsed light beam, the optical modulation device operative to provide for stroboscopic detection of a volume of the interrogation air region based on the modulated light pulses received by the optical detector and having an exposure time of multiple pulse periods.

Example 2 includes the air data system of Example 1, wherein the optical modulation device is operative to provide a variable delay with respect to the pulsed light beam, to dynamically vary the volume of the interrogation air region.

Example 3 includes the air data system of Example 2, wherein the volume of the interrogation air region is dynamically varied depending on conditions inferred from an internal or external control input.

Example 4 includes the air data system of any of Examples 1-3, wherein the at least one light source comprises a pulsed laser device mounted on a vehicle.

Example 5 includes the air data system of Example 4, wherein the pulsed laser device is part of a light detection and ranging (LiDAR) sensing apparatus.

Example 6 includes the air data system of Example 5, wherein the LiDAR sensing apparatus has a monostatic LiDAR configuration.

Example 7 includes the air data system of Example 6, wherein the monostatic LiDAR configuration has a variable short range return rejection.

Example 8 includes the air data system of any of Examples 4-7, wherein the vehicle is an aircraft.

Example 9 includes the air data system of any of Examples 1-8, wherein the optical modulation device comprises an electro-optic modulator (EOM).

Example 10 includes the air data system of any of Examples 1-8, wherein the optical modulation device comprises an acousto-optic modulator (AOM).

Example 11 includes the air data system of any of Examples 1-10, further comprising: a radio frequency (RF) driver and delay device operatively coupled to the optical modulation device, the RF driver and delay device configured to send an on/off trigger signal to the optical modulation device.

Example 12 includes the air data system of Example 11, wherein the RF driver and delay device is operative to receive a pick-off signal from the at least one light source.

Example 13 includes the air data system of any of Examples 11-12, wherein the RF driver and delay device is operative to receive an external or internal delay input to vary a time delay of the on/off trigger signal sent to the optical modulation device.

Example 14 includes the air data system of any of Examples 1-13, further comprising: a beam splitter operatively coupled between the at least one light source and the optical transceiver, the beam splitter configured to receive the emitted pulsed light beam from the at least one light source, the beam splitter operative to direct a first portion of the pulsed light beam to the optical transceiver and a second portion of the pulsed light beam to the optical detector; wherein the second portion of the pulsed light beam provides a reference for use by the optical detector in the stroboscopic detection based on the modulated light pulses from the optical modulation device.

Example 15 includes the air data system of Example 14, further comprising: a reference modulation device operatively coupled between the beam splitter and the optical detector, the reference modulation device operative to receive the second portion of the pulsed light beam through a reference channel, and output a modulated reference pulse to the optical detector; wherein the reference modulation device is operatively coupled to the RF driver and delay device; wherein the reference modulation device comprises an EOM or an AOM.

Example 16 includes the air data system of any of Examples 1-15, further comprising: a first optical fiber coupled between an output fiber coupling port of the at least one light source and a transmit channel fiber coupling port of the optical transceiver; a second optical fiber coupled between a receive channel fiber coupling port of optical transceiver and an input fiber coupling port of optical modulation device; and a third optical fiber coupled between an output fiber coupling port of the optical modulation device and an input fiber coupling port of the optical detector.

Example 17 includes an air data system, comprising: a laser device mounted on a vehicle and configured to emit a pulsed light beam; an optical transceiver operatively coupled to the laser device and configured to receive the emitted pulsed light beam, the optical transceiver operative to: transmit the pulsed light beam into an interrogation air region; and receive and collect scattered light pulses of the transmitted pulsed light beam from the interrogation air region; an optical modulation device operatively coupled to the optical transceiver, the optical modulation device configured to receive the collected scattered light pulses from the optical transceiver and output modulated light pulses, the optical modulation device comprising an electro-optic modulator (EOM) or an acousto-optic modulator (AOM); a radio frequency (RF) driver and delay device operatively coupled to the optical modulation device, the RF driver and delay device configured to send an on/off trigger signal to the optical modulation device; an optical detector operatively coupled to the optical modulation device and configured to receive the modulated light pulses from the optical modulation device; wherein the optical modulation device has a nanosecond-based rise/fall time that is synchronized and delayed with respect to the pulsed light beam, the optical modulation device operative to provide for stroboscopic detection of a volume of the interrogation air region based on the modulated light pulses received by the optical detector and having an exposure time of multiple pulse periods.

Example 18 includes the air data system of Example 17, wherein the RF driver and delay device is operative to receive an external or internal delay input to vary a time delay of the on/off trigger signal sent to the optical modulation device, to dynamically vary the volume of the interrogation air region.

Example 19 includes the air data system of any of Examples 17-18, further comprising: a beam splitter operatively coupled between the laser device and the optical transceiver, the beam splitter configured to receive the emitted pulsed light beam from the laser device, the beam splitter operative to direct a first portion of the pulsed light beam to the optical transceiver and a second portion of the pulsed light beam to the optical detector; wherein the second portion of the pulsed light beam provides a reference for use by the optical detector in the stroboscopic detection based on the modulated light pulses from the optical modulation device.

Example 20 includes the air data system of any of Examples 17-19, wherein the optical detector is operative to provide direct measurement of sky backscatter light frequencies to infer one or more Doppler shifts.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. An air data system, comprising:
at least one light source configured to emit a pulsed light beam;
an optical transceiver operatively coupled to the at least one light source and configured to receive the emitted pulsed light beam, the optical transceiver operative to:
transmit the pulsed light beam into an interrogation air region; and
receive and collect scattered light pulses of the transmitted pulsed light beam from the interrogation air region;
an optical modulation device operatively coupled to the optical transceiver, the optical modulation device configured to receive the collected scattered light pulses from the optical transceiver and output modulated light pulses;
an optical detector operatively coupled to the optical modulation device and configured to receive the modulated light pulses from the optical modulation device;
a beam splitter operatively coupled between the at least one light source and the optical transceiver, the beam splitter configured to receive the emitted pulsed light beam from the at least one light source, the beam splitter operative to direct a first portion of the pulsed light beam to the optical transceiver and a second portion of the pulsed light beam toward the optical detector; and
a reference modulation device operatively coupled between the beam splitter and the optical detector, the reference modulation device operative to receive the second portion of the pulsed light beam through a reference channel, and output a modulated reference pulse to the optical detector;
wherein the optical modulation device has a nanosecond-based rise/fall time that is synchronized and delayed with respect to the pulsed light beam, the optical modulation device operative to provide for stroboscopic detection of a volume of the interrogation air region based on the modulated light pulses received by the optical detector and having an exposure time of multiple pulse periods.

2. The air data system of claim 1, wherein the optical modulation device is operative to provide a variable delay with respect to the pulsed light beam, to dynamically vary the volume of the interrogation air region.

3. The air data system of claim 2, wherein the volume of the interrogation air region is dynamically varied depending on conditions inferred from an internal or external control input.

4. The air data system of claim 1, wherein the at least one light source comprises a pulsed laser device mounted on a vehicle.

5. The air data system of claim 4, wherein the pulsed laser device is part of a light detection and ranging (LiDAR) sensing apparatus.

6. The air data system of claim 5, wherein the LiDAR sensing apparatus has a monostatic LiDAR configuration.

7. The air data system of claim 6, wherein the monostatic LiDAR configuration has a variable short range return rejection.

8. The air data system of claim 4, wherein the vehicle is an aircraft.

9. The air data system of claim 1, wherein the optical modulation device comprises an electro-optic modulator (EOM).

10. The air data system of claim 1, wherein the optical modulation device comprises an acousto-optic modulator (AOM).

11. The air data system of claim 1, further comprising:
a radio frequency (RF) driver and delay device operatively coupled to the optical modulation device, the RF driver and delay device configured to send an on/off trigger signal to the optical modulation device.

12. The air data system of claim 11, wherein the RF driver and delay device is operative to receive a pick-off signal from the at least one light source.

13. The air data system of claim 11, wherein the RF driver and delay device is operative to receive an external or internal delay input to vary a time delay of the on/off trigger signal sent to the optical modulation device.

14. The air data system of claim 11,
wherein the second portion of the pulsed light beam provides a reference for use by the optical detector in the stroboscopic detection based on the modulated light pulses from the optical modulation device.

15. The air data system of claim 14,
wherein the reference modulation device is operatively coupled to the RF driver and delay device;
wherein the reference modulation device comprises an EOM or an AOM.

16. The air data system of claim 1, further comprising:
a first optical fiber coupled between an output fiber coupling port of the at least one light source and a transmit channel fiber coupling port of the optical transceiver;
a second optical fiber coupled between a receive channel fiber coupling port of optical transceiver and an input fiber coupling port of optical modulation device; and
a third optical fiber coupled between an output fiber coupling port of the optical modulation device and an input fiber coupling port of the optical detector.

17. An air data system, comprising:
a laser device mounted on a vehicle and configured to emit a pulsed light beam;
an optical transceiver operatively coupled to the laser device and configured to receive the emitted pulsed light beam, the optical transceiver operative to:
transmit the pulsed light beam into an interrogation air region; and
receive and collect scattered light pulses of the transmitted pulsed light beam from the interrogation air region;
an optical modulation device operatively coupled to the optical transceiver, the optical modulation device configured to receive the collected scattered light pulses from the optical transceiver and output modulated light pulses, the optical modulation device comprising an electro-optic modulator (EOM) or an acousto-optic modulator (AOM);
a radio frequency (RF) driver and delay device operatively coupled to the optical modulation device, the RF driver and delay device configured to send an on/off trigger signal to the optical modulation device;
an optical detector operatively coupled to the optical modulation device and configured to receive the modulated light pulses from the optical modulation device;
a beam splitter operatively coupled between the laser device and the optical transceiver, the beam splitter configured to receive the emitted pulsed light beam from the laser device, the beam splitter operative to direct a first portion of the pulsed light beam to the optical transceiver and a second portion of the pulsed light beam toward the optical detector; and
a reference modulation device operatively coupled between the beam splitter and the optical detector, the reference modulation device operative to receive the second portion of the pulsed light beam through a reference channel, and output a modulated reference pulse to the optical detector;
wherein the optical modulation device has a nanosecond-based rise/fall time that is synchronized and delayed with respect to the pulsed light beam, the optical modulation device operative to provide for stroboscopic detection of a volume of the interrogation air region based on the modulated light pulses received by the optical detector and having an exposure time of multiple pulse periods.

18. The air data system of claim 17, wherein the RF driver and delay device is operative to receive an external or internal delay input to vary a time delay of the on/off trigger signal sent to the optical modulation device, to dynamically vary the volume of the interrogation air region.

19. The air data system of claim 17, wherein the second portion of the pulsed light beam provides a reference for use by the optical detector in the stroboscopic detection based on the modulated light pulses from the optical modulation device.

20. The air data system of claim 17, wherein the optical detector is operative to provide direct measurement of sky backscatter light frequencies to infer one or more Doppler shifts.

* * * * *